UNITED STATES PATENT OFFICE.

GEORGE BERCY, OF MONROE, WISCONSIN.

COMPOUND FOR TREATING TOBACCO.

996,830.  Specification of Letters Patent.  Patented July 4, 1911.

No Drawing.  Application filed December 27, 1909.  Serial No. 534,991.

*To all whom it may concern:*

Be it known that I, GEORGE BERCY, a citizen of the United States, residing at Monroe, in the county of Green and State of Wisconsin, have invented certain new and useful Improvements in Compounds for Treating Tobacco, of which the following is a specification.

My invention relates to compounds for treating brittle, musty, moldy and woody smelling tobacco and has for its object the provision of a compound that will not only restore the tobacco to its soft and flexible condition and remove the musty, moldy and woody smelling condition but will in addition nourish and flavor it, improve its salability, and render the use of tobacco less harmful.

I make my improved compound in the following manner and in the following proportions. I take one-half pound of dried apricots, one-half pound of good eating apples, one-half pound of ripe bananas, one-half pound of dried prunes and one pound of ripe pineapple. Boil the fruit in two quarts of water for two hours. Then strain the liquid from the fruit, mash the fruit pulp and force it through a cullender into the liquid aforesaid. Pour the liquid and mashed pulp into a gallon jug and add enough water to fill the jug to the top, then allow the liquid to ferment. As the quantity of the liquid is reduced by overflow of the liquid and pulp caused by the expansion of the liquid during fermentation, I fill the jug to the top daily with water so as to allow the overflow to continue. After fermentation is completed strain the liquid into a larger vessel and add eight fluid ounces of good cider vinegar and eight fluid ounces of pure grain alcohol. The compound is then placed in a sealed vessel and set away for some time, preferably six months or longer, as the longer it stands the better it becomes.

In using my compound I add two quarts of water to the amount prepared as above described before applying it to the tobacco which may be dipped therein, sprayed therewith, or the compound applied in any other manner desired so that the leaves are treated as thoroughly as necessary to soften and sweeten the tobacco and flavor it to the extent desired. I do not however lay claim to any particular method of using the composition as it may be used in any manner found to produce the desired results.

Having thus described my invention what I claim is:

1. A compound for treating tobacco made from apples, pine-apples, bananas, dried apricots and prunes boiled in water, then strained, and the fruit pulp washed and put back in the liquid which is then fermented, cider vinegar and alcohol added, and the whole aged in a sealed receptacle.

2. A compound for treating tobacco made from two parts of pine-apple and one part each of apples, bananas, dried apricots and prunes boiled in water, then strained, and the fruit pulp washed and put back in the liquid which is then fermented and again strained, cider vinegar and alcohol then added to the liquid in the proportion of one part of each to approximately sixteen parts of the liquid, and the whole aged in a sealed receptacle.

In testimony whereof I hereto affix my signature in the presence of two witnesses.

GEORGE BERCY.

Witnesses:
J. H. DURST,
G. T. HODGES.

Copies of this patent may be obtained for five cents each, by addressing the "Commissioner of Patents, Washington, D. C."